United States Patent Office 2,931,792
Patented Apr. 5, 1960

2,931,792

PYROPHORIC CATALYTIC SYSTEMS

Robert S. Aries, New York, N.Y.

No Drawing. Application February 2, 1956
Serial No. 562,933

8 Claims. (Cl. 260—93.5)

The present invention is directed to novel catalytic systems for polymerizing ethylene and other vinyl-type alpha-beta ethylenically unsaturated monomers under particularly favorable conditions to yield products of high molecular weight which have properties superior to those heretofore known for the polymers of these same monomers.

In principle, these catalytically active systems consist of two components, one of them being a fine powder of a pyrophoric, easily oxidizable material suspended in the monomer or in an inert liquid, the other being a metal hydride or a metal organic compound capable of complexing with the aforesaid easily oxidizable material, such as metal alkyls, aryls, or Grignard reagents.

The polymerization of ethylene was first successfully carried out in the bulk phase at pressures of several hundred atmospheres and at temperatures around 200° C.; products obtained by this method are known as high pressure polyethylenes. They represent a plastic material with a greasy touch having a melting point of about 110° C. and a specific gravity of about 0.92. From the point of view of molecular structure these products consist of macro-molecules having number average molecular weights of about 25,000, weight average molecular weights of about 200,000 and possessing many short and a few long branches.

Recently several investigators have discovered methods of polymerizing ethylene under much milder conditions with new types of catalytically active systems. Specifically the Phillips Petroleum Company has disclosed the use of solid $Al_2O_3$—$Cr_2O_3$—$SiO_2$ catalysts at pressures up to 100 atmospheres and temperatures up to 150° C., the Standard Oil Company of Indiana has disclosed the use amongst others of certain activated molybdenum oxides supported on carriers, and Professor Karl Ziegler has discovered that certain combinations of metal halides and metal alkyls polymerize ethylene even at room temperature and atmospheric pressure.

My own investigations in this field have elucidated the nature of the catalytically-active principle involved and have added a novel type of efficient combinations of catalytically active materials hitherto unknown. In the course of these studies I prepared $TiCl_2$ and $TiCl_3$ in many different ways in the form of fine crystalline powders and combined them with metal hydride or metal alkyl type compounds to form novel types of extremely reactive and efficient polymerization catalysts. Both these lower chlorides of Ti are very sensitive to oxygen and, as a consequence, are pyrophoric if they are exposed in the form of a fine powder to air or oxygen. While experimenting with these materials and carrying out numerous polymerization experiments with ethylene and other vinyl-type monomers I noticed that sometimes the lower halides of Ti were only mildly pyrophoric and reacted only partly, if at all, when exposed to air. In all such cases the combinations of these lower halides with metal alkyls were either not at all active or only to a very small extent. On the other hand pyrophoric specimens always gave highly reactive combinations. This behaviour aroused my interest and I established the validity of the effectiveness as measured by pyrophoric activity by a series of special experiments in which the pyrophoric activity of $TiCl_2$ and $TiCl_3$ was destroyed or diminished by a large particle size of the powder or by the action of mercury, iodine and sulfur compounds on a finely divided suspension of these lower halides. The consistent high activity of the pyrophoric preparations of the lower halides of Ti suggested to me the idea that other materials chemically different from these lower halides might also prove to be efficient components provided they are pyrophoric and have a certain capacity to form complexes with the metal hydride or metal alkyl type components of the catalytically active system. I immediately tested this hypothesis by combining very finely divided pyrophoric iron as one component together with diethyl zinc as the other ingredient and found surprisingly enough that a combination of these two materials in an inert solvent is a very efficient catalyst for the polymerization of ethylene at atmospheric pressure and room temperature. Then I proceeded to test several other pyrophoric metal powders which I prepared by different methods and established the fact that each of them could be rendered catalytically active for vinyl-type polymerizations by the addition of a soluble metal hydride or metal alkyl to polymerize ethylene and other vinyl-type monomers under unusually mild conditions to high molecular weight compounds with valuable mechanical, thermal and electrical properties.

The pyrophoric materials are obtained by the reduction of finely divided compounds of metal preferably in a stream of hydrogen. The compounds are preferably combinations of one or more polyvalent metals selected from the group consisting of the metals of groups IV, VI–B and VIII of the periodic system, as shown in the periodic chart of the elements between the front cover pages of The Merck Index, sixth edition (1952), capable of existing in a plurality of valence states such as iron, nickel, cobalt, platinum, titanium, lead, cerium, uranium, thorium, zirconium, chromium, and the like, the metals being present as oxides or as salts with inorganic acids such as nitric, sulfuric or carbonic acids, or with organic acids such as oxalates, citrates, tartrates, or others which leave no residue upon reduction with hydrogen. The metals capable of existing in a plurality of valence states are hereinafter referred to as "multivalent," the preferred multivalent metals being iron, nickel and cobalt.

The pyrophoric materials must be of a particle size no greater than about 50 microns and often as low as 5 microns. In addition to the small particle size, however, it is necessary that the reduction was carried out in a manner which will not destroy the pyrophorosity of the end product. In Thorpe's Dictionary of Applied Chemistry, 4th edition, vol. X, p. 327, the process for preparing pyrophoric metals is described in detail. The hydrogenation temperature must be controlled since cobalt, for example, is pyrophoric when reduced at 400° C. but is not pyrophoric if reduced at 600° C. As a matter of fact, although cobalt obtained by reduction at 870° C. is not at all pyrophoric, if the cobalt compound is first mixed with aluminum and then reduced the end product is highly pyrophoric. This may be because the alumina or its reduction products disperses the cobalt. Consequently, mixtures of metals may also be employed.

The pyrophoric metal produced by hydrogenation is believed to be the pure metal but it is possible that it includes a greater or lesser amount of the hydride of the metal in intimate admixture with the metal per se. It is the pyrophoric nature of the material rather than its actual constitution which is important, however, and the term "pyrophoric metal" as employed herein is intended to cover the metal per se as well as the hydride of the metal or mixtures thereof.

The activating material which is added to the pyrophoric metal constitutes a metal hydride or a metal organic compound. Suitable metals for the second component include a metal selected from the group consisting of the metals of groups I–A, II, and III–A of the periodic system, as shown in the periodic chart of the elements between the front cover pages of The Merck Index, sixth edition (1952), such as aluminum, zinc, magnesium, and the alkali metals such as lithium, potassium, and sodium. These metals may be present as hydrides, alkyls, aryls, or when the metal is polyvalent, as Grignard reagents combined with a halide atom and an organic radical such as an alkyl or aryl group. Representative organic metal compounds include trimethyl aluminum, triethyl aluminum, tripropyl aluminum, trioctyl aluminum, dimethyl zinc, diethyl zinc, dipropyl zinc, dimethyl magnesium, diethyl magnesium, dipropyl magnesium, lithium ethyl, lithium butyl, ethyl magnesium bromide, ethyl magnesium chloride, benzyl magnesium bromide, benzyl magnesium chloride, tolyl magnesium chloride, tolyl magnesium bromide, and the like. The fluorides and iodides can also be used as components of the Grignard reagents but the bromides are preferred, although the chlorides are quite satisfactory.

The activator can be present to the extent of only about 0.01 mole per mole of pyrophoric metal. Preferably for each mole of metal at least 0.1 mole of activator is employed. While there is no actual upper limit, little advantage is gained by increasing the mole ratio of activator to pyrophoric metal beyond 1.

The two components of the catalytically active system are brought together in an inert liquid such as a hydrocarbon, a halogenated hydrocarbon or an ether and are suspended therein by agitation. Suitable liquids include aliphatic hydrocarbons such as hexane, heptane, benzine, petroleum ether, and the like, cycloaliphatic hydrocarbons such as cyclohexane, decalin, and the like, aromatic hydrocarbons such as benzene, xylene, and the like, hydroaromatic compounds such as tetralin and the like, halogenated hydrocarbons such as carbon tetrachloride, and the like, and ethers such as dioxane, and the like.

Vinyl monomers are then added to the suspension of the catalytically active system and the polymerization proceeds even at substantially atmospheric pressures. If desired the temperature may be elevated in order to accelerate the reaction. Gaseous olefins may be polymerized in this manner as well as normally liquid olefinic materials such as styrene, acrylates and other vinyl-type monomers.

The following examples illustrate the preparation of the novel catalytically active systems as well as their use in polymerizations:

Example I 5 grams of finely powdered iron oxalate were placed in a platinum boat which was inserted in a Pyrex glass tube which was placed in a suitable electrical furnace capable of being heated to 600° C. With the usual precaution of sweeping out air by passing nitrogen through the tube, the iron oxalate was then reduced by a stream of hydrogen at 375° C., for 3 hours. The product of reduction was finely divided iron (containing possibly also some iron hydride) of a gray color. When this material, after cooling in the tube under its atmosphere of hydrogen, was brought into contact with air it immediately began to glow with a bright red color and was oxidized to $Fe_2O_3$. A similar lot of material weighing two grams was transferred with suitable precautions out of contact with air to 50 ml. of air- and $H_2O$-free heptane under a blanket of dry nitrogen to a 3-necked flask of 250 ml. capacity provided with a mercury-sealed agitator and suitable connections. Then 0.5 gram of diethyl zinc in 10 ml. of heptane was added with constant agitation. There was a slight immediate rise in temperature, and the mixture was held at 50° C. The necessary connections were made and dry, airfree ethylene was bubbled in at the rate of about 50 ml. per minute at atmospheric pressure. After an induction period of about 10 minutes the ethylene was being visibly absorbed and a haze of gray solid polyethylene began to appear. The formation of solid continued for 8 hours and the flask was partly filled with a dark gray swollen gelatinous semi-solid mass of polymer and solvent which stopped the stirrer. The apparatus was disconnected and the contents of the flask were diluted with methanolic hydrogen chloride and transferred to a porcelain Büchner funnel and washed with dilute methanolic hydrogen chloride until a sample of filtrate gave a negative test for iron. Then the solid which had gradually become lighter in color as the washing proceeded was thoroughly washed with methanol and dried in a vacuum oven at 40° C. for 2 hours. The product was 36.2 grams of a snow-white, odorless, light fluffy, powder. This polyethylene was found to have the following properties:

| | |
|---|---|
| Density | 0.947 |
| Melting point °C | 132.7 |
| Intrinsic viscosity $[\eta]$ | 1.36 |
| Tensile strength at 25° C p.s.i | 6850 |
| Impact strength at 25° C | 28.9 |
| Flexural strength at 25° C p.s.i | 6240 |
| Brittle point °C | −65 |
| Ash content p.p.m | 2.8 |
| Dielectric constant at $10^6$ cycles | 2.44 |
| Power factor at $10^6$ cycles | 0.0005 |

These data show the polymer obtained by the use of the pyrophoric iron and diethyl zinc as the catalytically active system has extremely desirable properties as a plastic material for molding, casting, spinning and extrusion.

Example II

Using a procedure similar to that of Example I. 5 grams of nickel carbonate were reduced with hydrogen at 345° C. for 2 hours. The product was pyrophoric. The reduced product from 4 grams of nickel carbonate with the precautions indicated in the previous example was transferred with 100 ml. of dry, oxygen-free decalin to a 500 ml. stainless steel autoclave provided with a stirrer. The autoclave had previously been freed of air by flushing it with dry, oxygen-free nitrogen. 0.5 gram of lithium ethyl in a 20 ml. of dry, oxygen-free decalin was added to the suspension of nickel in decalin with stirring and the temperature was then raised to 75° C. The system was then flushed with pure, dry ethylene, and then the ethylene pressure was raised to 10 atmospheres. At the end of 4 hours the pressure of ethylene had dropped to about 3 atmospheres, and fresh ethylene was admitted to raise the pressure to 10 atmospheres. The pressure was maintained at approximately 10 atmospheres for 16 additional hours by bleeding in ethylene from a small cylinder of the compressed gas. At the end of 20 hours, the charge was worked up as described in Example I. The product was 41 grams of almost pure white odorless polymer.

The properties were determined as in Example I and found to be:

| | |
|---|---|
| Density | 0.942 |
| Melting point °C | 131.8 |
| $[\eta]$ | 1.17 |
| Tensile strength at 25° C p.s.i | 6740 |
| Flexural strength at 25° C p.s.i | 8860 |
| Brittle point °C | −68 |
| Ash content p.p.m | 4.9 |
| Dielectric constant at $10^6$ cycles | 2.51 |
| Power factor at $10^6$ cycles | 0.00046 |

Example III

Using the procedure of Example I, 2.4 grams of cobalt oxide were reduced with hydrogen at 480° C. for 3½ hours. A sample proved to be pyrophoric. The reduced product from the 2.4 grams of cobalt oxide was transferred to the autoclave with 100 ml. of dry, air-free octane and activated with 1.0 gram of ethyl magnesium bromide in 50 ml. of octane. The temperature was maintained at 50° C. and dry ethylene was passed in under 5 atmospheres pressure which was maintained constant over a period of 24 hours by further addition. When the product was worked up as before it was 37.4 grams of almost white, odorless polyethylene, having the following properties:

| | |
|---|---|
| Density | 0.951 |
| Melting point °C | 133.6 |
| $[\eta]$ | 1.39 |
| Tensile strength at 25° C. p.s.i. | 5950 |
| Flexural strength at 25° C. p.s.i. | 9140 |
| Brittle point °C | −64.2 |
| Ash p.p.m. | 7.6 |
| Dielectric constant at $10^6$ cycles | 2.51 |
| Power factor at $10^6$ cycles | 0.00061 |

Example IV 1.3 grams of ferric nitrate was reduced with hydrogen for 3 hours at 415° C. The gray product was pyrophoric. The reduced product from 1.3 grams of ferric nitrate was suspended in 100 ml. of dry, air-free tetralin, transferred to the autoclave and activated with 0.5 gram of aluminum triethyl in 20 ml. of dry tetralin. Dry, oxygen-free propylene was bubbled in at the rate of 50 ml. per minute for 3 hours. The product on working up as for polyethylene yielded 3.8 grams of almost white, odorless isotactic polypropylene with the following properties:

| | |
|---|---|
| Density | 0.926 |
| Melting point °C | 141 |
| $[\eta]$ | 1.28 |
| Brittle point °C | −57 |
| Ash p.p.m. | 6.4 |

The above properties characterize the polypropylene produced as a very valuable material for molding, casting, spinning and extrusion.

Example V 3.2 grams of very finely divided $Al_2O_3$ were suspended in a solution of 0.5 gram of nickel sulfate in 50 ml. of water. Dilute NaOH solution was added with vigorous stirring by a mechanical stirrer until all the nickel was precipitated from solution. The suspension was carefully filtered and washed with water until the washings were free of sulfate. The product was dried at 150° C. for 6 hours and then subjected to reduction by hydrogen as in Example I, namely 3 hours at 375° C. The product was a fine black powder which heated up spontaneously when exposed to air, showing that the deposited metal or metal hydride on the carrier was pyrophoric. 1.8 grams of the nickel-coated $Al_2O_3$ was suspended in 50 ml. of dry, oxygen-free heptane and transferred to the 3-necked flask under a blanket of dry nitrogen, and 0.25 gram of aluminum triisobutyl in 10 ml. of dry heptane was added with stirring. Then purified ethylene was bubbled through the heptane suspension for 6 hours and the product was worked up as indicated in Example I, and yielded 5.8 grams of white, odorless polyethylene powder with the following properties:

| | |
|---|---|
| Density | 0.952 |
| Melting point °C | 133.2 |
| $[\eta]$ | 1.52 |
| Tensile strength p.s.i. | 6480 |
| Flexural strength at 25° C. p.s.i. | 8860 |
| Brittle point °C | −61.5 |
| Ash p.p.m. | 15.5 |

Example VI

In this case 0.5 gram of platinum oxide was reduced by hydrogen under the conditions of Example I. The product was pyrophoric. The reduced material suspended in dry heptane was activated with diethyl zinc and used to polymerize ethylene at atmospheric pressure and 50° C. The product was worked up as in Example I.

Example VII

This was carried out precisely like Example II, except that styrene monomer was used instead of ethylene. The polystyrene product was worked up similarly to the polyethylene. It was 19.5 grams of an almost white powder with the following properties:

| | |
|---|---|
| Density | 1.11 |
| Melting point °C | 118 |
| $[\eta]$ | 1.65 |

An X-ray diagram taken with CuK radiation revealed that part of this material had crystalline areas as described by G. Natta for isotactic polystyrene.

While the procedure described in Examples I to VII were carried out it was noticed that the activity of the reduced metal compounds decreased very rapidly as soon as the pyrophoric character was diminished or entirely eliminated by pretreatments with air, iodine or such organic oxidizing agents as nitro-compounds or peroxides. The more reactive the pyrophoric metal powder was to oxygen (air) the more catalytically active was it in combination with an activator as hereinabove set forth.

Various changes and modifications may be made without departing from the spirit and scope of the present invention and it is intended that such obvious changes and modifications be embraced by the annexed claims.

What I claim is:

1. The process for the polymerization of an alpha-beta ethylenically unsaturated hydrocarbon monomer selected from the group consisting of the gaseous olefins and styrene which comprises maintaining said monomer in contact with a suspension in an inert organic liquid of a catalytically active system consisting essentially of particles of a pyrophoric multivalent metal selected from the group consisting of the metals of groups IV, VI–B and VIII of the periodic system having a particle size less than about 50 microns, and as an activator therefor, at least 0.01 mole for each mole of pyrophoric metal, of a metal compound selected from the group consisting of metal hydrides, metal alkyls and Grignard reagents, the metal in said metal compound being selected from the group consisting of the metals of groups I–A, II and III–A of the periodic system.

2. The process for the polymerization of an alpha-beta ethylenically unsaturated hydrocarbon monomer selected from the group consisting of the gaseous olefins and styrene which comprises maintaining said monomer in contact with a suspension in an inert organic liquid of a catalytically active system consisting essentially of particles of a pyrophoric multivalent metal selected from the group consisting of the metals of groups IV, VI–B and VIII of the periodic system having a particle size ranging between about 5 and 50 microns, and as an activator therefor, at least 0.01 mole for each mole of pyrophoric metal, of a metal compound selected from the group consisting of metal hydrides, metal alkyls and Grignard reagents, the metal in said metal compound being selected from the group consisting of the metals of groups I–A, II and III–A of the periodic system.

3. The process for the polymerization of an alpha-beta ethylenically unsaturated hydrocarbon monomer selected from the group consisting of the gaseous olefins and styrene which comprises maintaining said monomer in contact with a suspension in an inert organic liquid of a catalytically active system consisting essentially of particles of a pyrophoric multivalent metal selected from the group consisting of the metals of groups IV, VI-B and VIII of the periodic system having a particle size ranging between about 5 and 50 microns, and as an activator therefor, from about 0.01 to 1.0 mole for each mole of pyrophoric metal, of a metal compound selected from the group consisting of metal hydrides, metal alkyls and Grignard reagents, the metal in said metal compound being selected from the group consisting of the metals of groups I-A, II and III-A of the periodic system.

4. The process of claim 3, wherein said pyrophoric metal comprises titanium.

5. The process of claim 3, wherein said pyrophoric metal is selected from the group consisting of the metals of group VIII of the periodic system.

6. The process of claim 3, wherein said monomer comprises ethylene.

7. The process of claim 3, wherein said monomer comprises propylene.

8. The process of claim 3, wherein said monomer comprises styrene.

References Cited in the file of this patent

UNITED STATES PATENTS

| 2,180,672 | Frey | Nov. 21, 1939 |
| 2,205,552 | Arnold | June 25, 1940 |
| 2,446,132 | Evans | July 27, 1948 |
| 2,457,719 | Pine et al. | Dec. 28, 1948 |
| 2,513,180 | Kemp | June 27, 1950 |
| 2,659,717 | Park | Nov. 17, 1953 |
| 2,721,189 | Anderson et al. | Oct. 28, 1955 |
| 2,781,410 | Ziegler et al. | Feb. 12, 1957 |

FOREIGN PATENTS

| 534,792 | Belgium | Jan. 31, 1955 |

OTHER REFERENCES

The Journal of the Society of Chemical Industry, Japan, 41 (1939), pages 22B and 23B, Tokyo, Japan.

High Surface Sodium on Inert Solids by U.S. Industrial Chemicals Co., 120 Broadway, N.Y.5, N.Y. Copyright 1953, page 10 relied on.